July 1, 1969 C. MUNĚ 3,453,408

SNAP-IN MOUNTING DEVICE FOR CIRCUIT BREAKERS

Filed July 31, 1967 Sheet 1 of 4

INVENTOR.
CHARLES MUNĚ
BY Denny and Denny
HIS ATTORNEYS.

INVENTOR.
CHARLES MUNE
BY Denny and Denny
HIS ATTORNEYS.

INVENTOR.
CHARLES MUNÉ
BY Denny and Denny
HIS ATTORNEYS.

INVENTOR.
CHARLES MUNE
BY Denny and Denny
HIS ATTORNEYS.

United States Patent Office 3,453,408
Patented July 1, 1969

3,453,408

SNAP-IN MOUNTING DEVICE FOR CIRCUIT BREAKERS

Charles Muné, Trenton, N.J., assignor to Heinemann Electric Company, Trenton, N.J., a corporation of New Jersey Filed July 31, 1967, Ser. No. 657,259
Int. Cl. H01h 9/02
U.S. Cl. 200—168 11 Claims

ABSTRACT OF THE DISCLOSURE

A circuit breaker and a snap-in mounting device are provided comprising a plate and a clip for mounting the circuit breaker to a panel. The plate is secured in abuttment with the front wall of the circuit breaker by lugs extending from the back of the plate into the front wall of the circuit breaker, so that the attachment between the plate and the circuit breaker is not visible from the front of the plate, and the clip has a locking or cam-like portion which locks a portion of the panel between the clip and the plate. The clip is initially separate from the plate, but is preassembled thereto prior to securing the snap-in mounting device to the circuit breaker.

*Background of the invention*

It is customary in some usese of circuit breakers to mount them on panels. In one previous mounting arrangement screws were placed through the panel and threaded into threaded inserts carried by the circuit breaker case. This required the circuit breaker to be first placed behind the panel and resulted in the screw heads being visible on the front of the panel.

Where the panels are large or where the panels have a restricted amount of space behind them, it is more convenient to be able to insert the circuit breaker from the front of the panel. Also, for appearance's sake, it is sometimes desirable not to have any screw heads visible on the front of the panel.

*Brief summary of the invention*

Thus, it is an object of this invention to provide a snap-in mounting device secured to the front wall of the circuit breaker by which it may be mounted on a panel, from the front of the panel, the circuit breaker case being disposed for the most part, behind the panel.

It is a further object to provide a mounting device without any screw heads, or other fasteners, being visible from the front of the panel.

In this invention, the panel on which the circuit breaker is to be mounted is provided with a hole of approximately the same width as the case and a length longer than that of the case to define at least one space between the case and the adjacent panel portion. The snap-in mounting device includes an integarl lug projecting into the front wall of the case and carried by the case. The plate carries a clip extending into the space and which locks with the adjacent edge portion of the panel to mount the circuit breaker on the panel.

The clip, in one embodiment, is a separate piece from the plate and has a foot with a hole through which the lug extends. The plate has a recess which receives a part of the clip to bias the foot against the lug and to preload the clip, so that the clip is thereby secured to the plate as a subassembly prior to its being secured to the circuit breaker case.

The foregoing and other objects of this invention, the principles of this invention, and the best modes in which I have contemplated applying such principles will more fully appear from the following description and accompanying drawings in illustration thereof.

*Brief description of the views*

Figure 5:
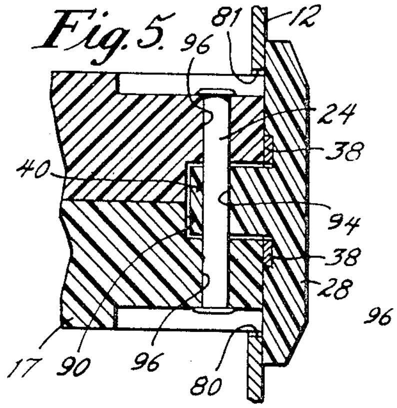
Figure 4:
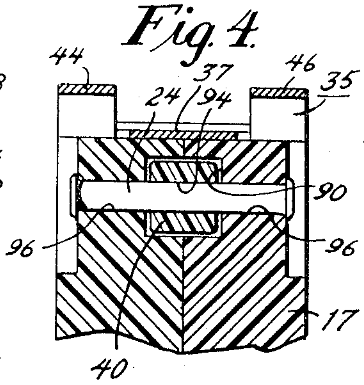
Figure 7:
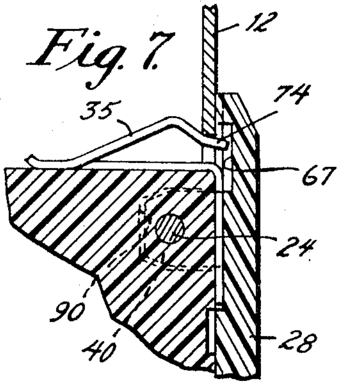
Figure 3:
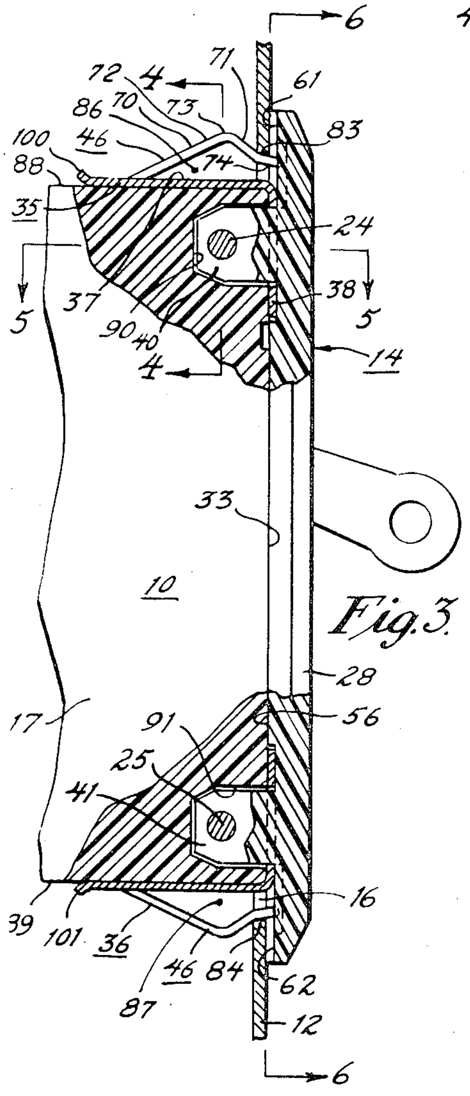
FIG. 3 is an enlarged side elevation of the circuit breaker, and the snap-in mounting device, shown in FIGS. 1 and 2, and illustrating parts of the circuit breaker, the snap-in mounting device, and the panel in cross section, the circuit breaker and the panel being only shown partially.
Figure 6:
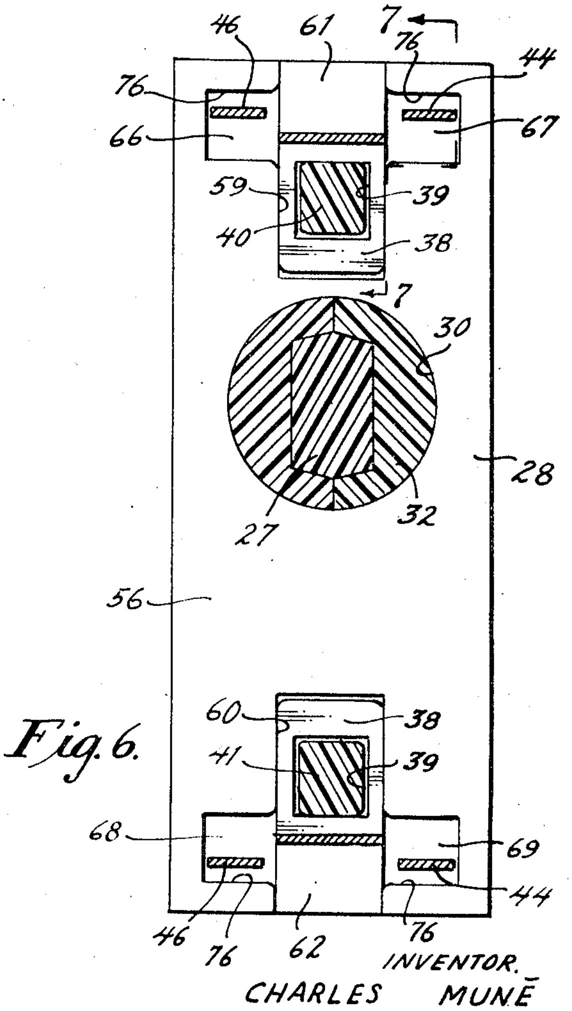
Figure 9:
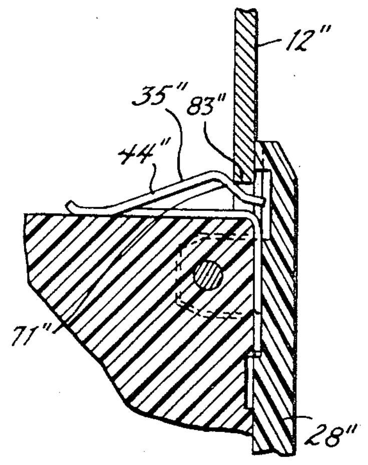
Figure 10:
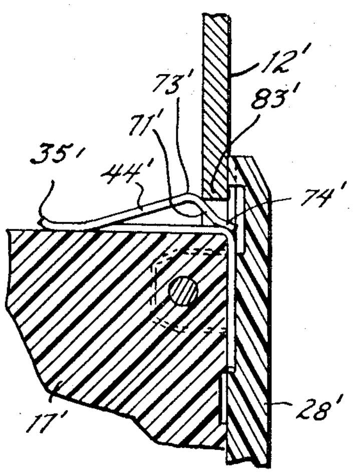
Figure 8:
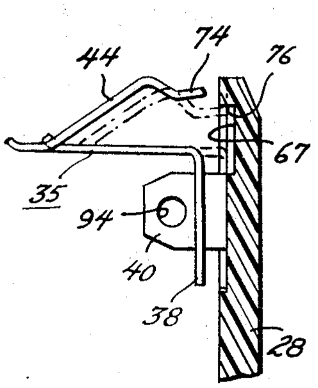
Figure 12:
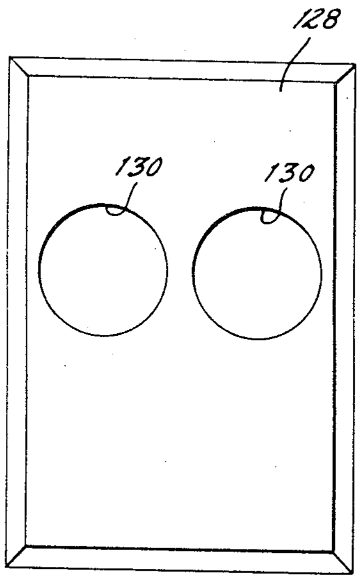
Figure 13:
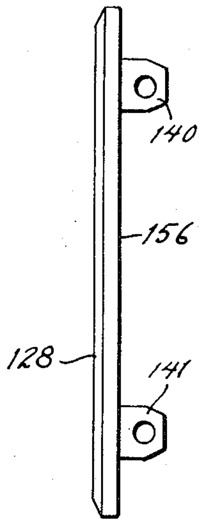
Figure 14:
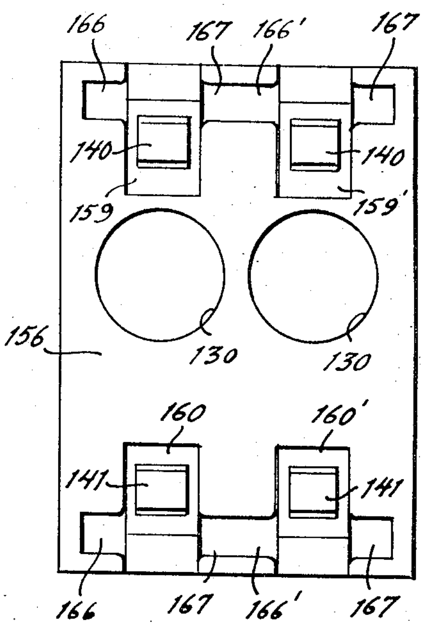
Figures 11, 15, 16, 17:
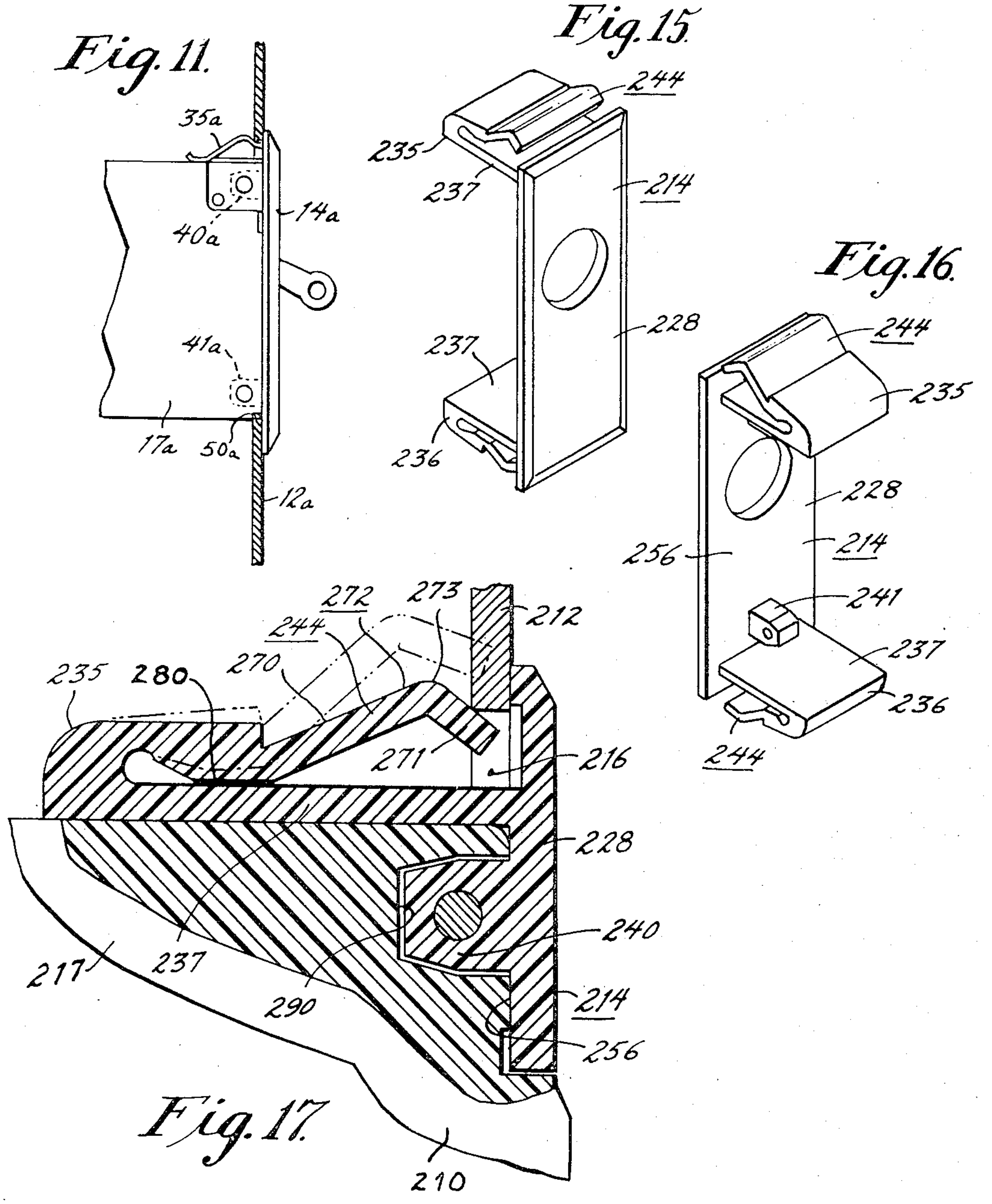

FIGS. 4 and 5 are partial sectional views taken along the lines 4—4 and 5—5 in FIG. 3;

FIG. 6 is a view taken along line 6—6 in FIG. 3, showing the clips partially in section and the back surface of the plate in elevation;

FIG. 7 is a partial sectional view taken along the line 7—7 in FIG. 6;

FIG. 8 is a view showing one end portion of the plate and a clip about to be secured to the plate;

FIGS. 9 and 10 are views similar to the upper portion of FIG. 3, but showing the use of thicker panels than shown in FIG. 3;

FIG. 11 is a view similar to FIG. 3, but at a reduced scale and showing another embodiment of this invention using only one clip;

FIGS. 12, 13, and 14 show the invention incorporated in a snap-in mounting device for two adjacent side-by-side circuit breakers (not shown), FIG. 12 being a front view, FIG. 13 being a right hand side view, and FIG. 14 being a back view;

FIGS. 15 and 16 are front and back perspective views, respectively, of another embodiment of this invention showing the clips formed integrally with the plate; and FIG. 17 is a partial cross sectional view illustrating one end portion of the snap-in mounting device illustrated in FIGS. 15 and 16 assembled to a circuit breaker and secured to a panel.

*Description*

Figure 1:
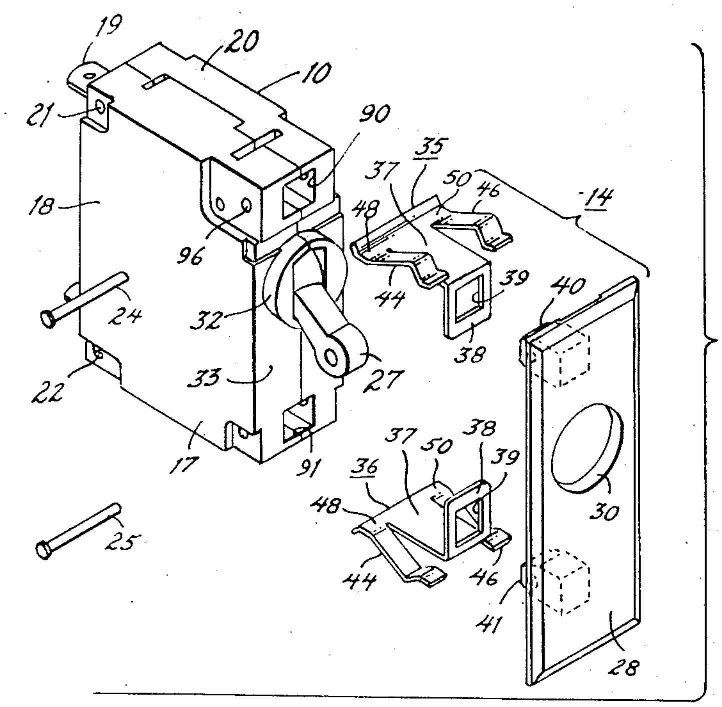
FIG. 1 is an exploded, perspective view showing a circuit breaker and the snap-in mounting device constructed in accordance with this invention.
Figure 2:
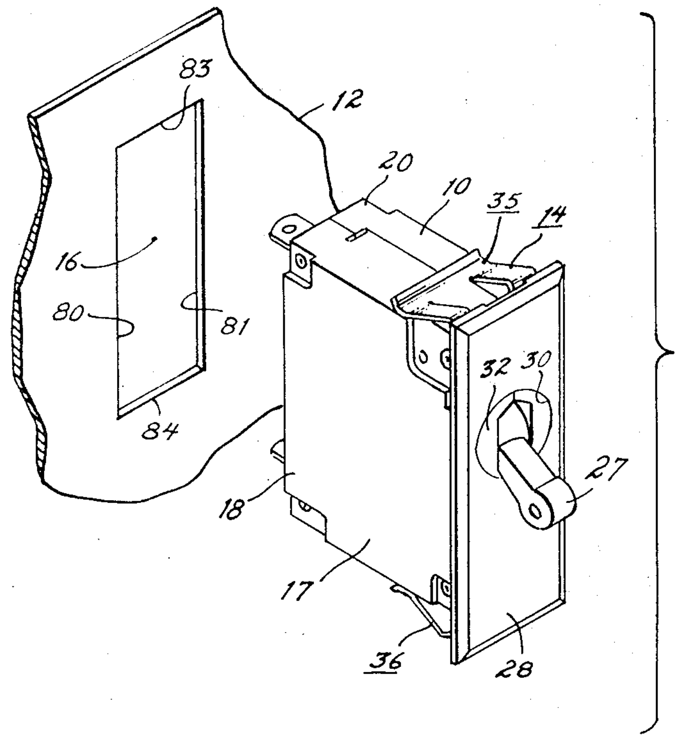
FIG. 2 is a perspective view of the circuit breaker with the snap-in mounting device shown in FIG. 1 secured thereto prior to attachment to a panel, the latter being partially shown.

Referring to the drawings, a circuit breaker 10 is illustrated secured to a panel 12, FIG. 3, by a snap-in mounting device 14, FIGS. 1 and 2, constructed in accordance with this present invention.

The panel 12 is formed with a generally rectangular hole or opening 16, FIG. 2, into which the circuit breaker 10 may be inserted from the front of the panel 12 and secured to the panel 12 by the snap-in mounting device 14. The circuit breaker 10 includes a generally hexahedronal case 17 formed by two approximate half-cases 18 and 20 which are secured together by suitable rivets 21, 22, 24, and 25 which extend through the half cases 18 and 20 near the four corners of the case 17, as shown. The circuit breaker 10 includes terminals 19 extending rearwardly from the back wall of the case 17, as shown.

Referring to FIG. 1, the snap-in mounting device 14 comprises a generally flat plate 28, preferably made of plastic, electric insulating material, such as Bakelite. The plate 28 has a laterally, centrally spaced circular hole 30 adapted to receive the circular handle boss 32, FIG. 1, which projects from the front wall 33 of the circuit breaker 10. Preferably, the thickness of the plate 28 is such that when it is in abutment with the front wall 33 of the circuit breaker, the handle boss 32 does not project beyond the plate 28, but, of course, the handle 27 extends outwardly, as shown.

Referring to FIGS. 2 and 3, mounted at the top and front corner of the case 17 is a snap-in mounting clip 35 and at the bottom and front corner of the case 17 is a snap-in mounting clip 36, the clips 35 and 36 being substantially identical to each other.

Each clip 35 or 36. FIG. 1, comprises a body 37 and a foot 38 disposed at about a right angle to each other. Each foot 38 has a generally rectangular opening 39 through which projects one or the other of rectangular, short lugs or columns 40 or 41 integral with, and projecting from, the back surface of the plate 28 near opposite ends thereof. Each clip 35 or 36 further comprises two spring arms 44 and 46, one on each side of the body 37, the arms 44 and 46 being connected to the body 42 by integral tabs 48 and 50.

Referring to FIGS. 3 and 6, the back surface 56 of the plate 28 is formed with depressed wells 59 and 60 and surrounding the lugs 40 and 41 on all four sides. An open ended slot 61 is formed above the lug 40 and an open ended slot 62 is formed below the lug 41, as illustrated, into which the blade of a screw driver (not illustrated) may be inserted to pry the snap-in mounting device 14 from the panel 12, when desired, instead of having to rely on pulling on the handle 27. If desired, the slots 61 and 62 may be made deeper than the wells 59 and 60 to accept a thicker screw driver blade.

On opposite sides of the open ended slots 61 and 62 are formed rectangular recesses or depressions 66, 67, and 68, 69, respectively, which communicate with, but are slightly deeper than, the wells 59, 60, and slots 61, 62, the recesses 66, 67, 68 and 69 receiving the ends of the spring arms 44 and 46. The wells 59 and 60, and the open ended slots 61 and 62, are made deep enough to accommodate the thickness of the feet 38 without any portion of the latter extending beyond the back surface of the plate 28.

As illustrated in FIG. 3, the spring locking arms 44 and 46 have locking or cam-like portions 72 comprising sloping portions 70 disposed at an angle to the bodies 37, curved sections 73, sloping sections 71, and legs 74, the portions 70 and 71 preferably sloping at an obtuse angle to each other.

The generally rectangular hole 16, FIG. 2, in the panel 12, is defined by side edge portions 80 and 81 which are spaced apart slightly more than the width of the case 17, FIG. 5, and by top and bottom edge portions 83 and 84 which are spaced apart substantially more than the height of the case, see FIG. 3, to define a space 86 between the top surface 88 of the case and the edge portion 83 of the panel into which is inserted the clip 35 and a space 87 between the bottom surface 89 of the case and the adjacent edge surface 84 of the panel into which is inserted the clip 36. The plate 28 is made long enough and wide enough to overlap or overhang the edge portions of the panel defining the hole 16, as shown, on all four sides.

The clips 35 and 36 are first assembled to the plate 28 by placing the lugs 40 and 41 through the holes 39 in the feet 38 and the arms 44 and 46 are flexed until the legs 74 can be placed in the recesses 66, 67, 68, and 69 bearing outwardly, i.e., the legs 74 bear against the top and bottom walls 76 of the recesses, thereby assuring that the clips 35 and 36 remain secured to the plate 28 as a subassembly. FIG. 8 illustrates in solid lines the clip 35, in its free position and on the lug 40, just before the leg 74 is flexed and inserted into the recess 74, the subassembly position being illustrated in dot-dash lines in which the leg 74 is biased against the wall 76.

The feet 38 are biased against the top surface of the lug 40 and the bottom surface of the lug 41, as shown in FIG. 6, the wells 59 and 60 being made sufficiently long. Preferably, the sides of the lugs 40 and 41 make a loose fit with the holes 39 in the feet 38, the sides of the feet 38 being received in a slip fit with the side walls of the wells 59 and 60.

The lugs 40 and 41 are then inserted in the wells 90 and 91, respectively, formed approximately one-half in each half-case 18 and 20 in the front wall thereof, so that the plate's back surface 56 abuts the case front surface 33, FIG. 3, and thereafter the rivets 24 and 25 are inserted into the holes in the half-cases and the holes 94 in the lugs 40 and 41, trapping the feet 38 between the case 17 and the plate 28. The rivets 24 and 25 are now peened to secure the snap-in mounting device 14 to the circuit breaker 10. Preferably the holes 94 in the lugs 40 and 41 are slightly off center, to the right as viewed in FIG. 5, so that the rivet will bear on the left portion of the hole 94 and pull the plate toward the case 17, assuring abutment of the plate 28 with the front wall of the case 17.

The circuit breaker 10 may now be mounted to the panel 12 by inserting the circuit breaker 10 into the panel 12 from the front thereof, the case 17 being freely received by the hole 16. As the case 17 is inserted, the sloping portions 70 of the clips 35 and 36 engage the panel edge portions 83 and 84. As the inserting movement is continued, the arms 44 and 46 flex, the legs 74 moving in the recesses 66, 67, 68, and 69 away from the walls 76 and toward the case. As the forward movement of the case 17 is continued, the edge portions 83 and 84 engage the curved sections 73 and further flex the arms, permitting the assembly to move forward until the back surface 56 of the plate 28 abuts the panel 12, at which time the arms 44 and 46 snap towards the edge portions 83 and 84, substantially simultaneously with the upper and lower portions of the plate 28 (which overhang the panel 12) coming into abutment with the panel 12. The panel edge portions 83 and 84 are now trapped and locked between the cam-like portions 72 and the portions of the plate 28 overlapping the panel.

To remove the circuit breaker from the panel 12 it is only necessary to insert a prying screw driver blade (not shown) into the slots 61 and 62, or to grasp the handle 27 and to pull it outwardly with a sufficient force, to overcome the spring bias of the arms 44 and 46 at which time the edge portions 83 and 84 bear on the sloping surfaces 71, causing the arms 44 and 46 to flex inwardly, releasing the panel 12, at which time the circuit breaker 10 may be completely withdrawn from the panel.

To facilitate the assembly of the clips 35 and 36 to the top and bottom surfaces of the case, the forward parts of the clips may be heeled, as shown at 100 and 101, FIG. 3.

Depending on the thickness of the panel 12, the edge portions 83 and 84 will contact the sloping portions 71 at various locations. FIG. 3 illustrates a minimum panel thickness in which event the contact is at the part of the sloping portion adjacent the legs 74. FIG. 10 illustrates a panel 12' of maximum thickness in which event the contact between the edge portion 83' and the sloping portion 71' is adjacent the curved section 73', and the arm 44' is flexed so that the leg 74' almost, but not quite, engages the case 17'. FIG. 9 illustrates a panel 12'' of a thickness between that of the panels illustrated in FIGS. 3 and 10 showing the edge portion 83'' contacting the sloping portion 71'' at an intermediate position with the arm 44'' being flexed to an intermediate position also. In FIGS. 9 and 10 the plates 28'' and 28' illustrated are the same as the plate 28 previously described. Also, the clips 35'' and 35' are the same as previously described.

FIG. 11 illustrates a modification of this invention which is generally similar to that illustrated in FIGS. 1 to 7, except that the snap-in mounting device **14*a* is provided with one clip 35*a* only. The bottom wall of the circuit breaker case 17*a* has a notch 50*a*, at the lower right hand corner, to receive a portion of the panel 12*a*, the hole in the panel 12*a* being made close fitting with the circuit breaker case 17*a* on its two sides. While the snap-in mounting device 14*a* is secured to the circuit breaker case by two lugs 40*a* and 41*a***, as in the embodiment of FIGS. 1 to 7, it is seen that one of these could also be omitted, in some instances.

Referring to FIGS. 12, 13, and 14, this invention is illustrated adapted for use with two circuit breakers disposed side-by-side, the circuit breakers not being illustrated. A plate 128 is provided having two aligned holes 130 through which the handle bosses (not shown) of the circuit breaker case may extend. The back surface 156 of the plate has four integral lugs 140 and 141 to be received in wells (not shown) formed in the front wall of the circuit breaker case.

The back surface 156, FIG. 14, is formed with recesses 159, 159′, 160 and 160′ to receive the clips (not shown) and, preferably, to facilitate the molding of the plate the middle recesses 167 and 166′ are shown in communication with each other.

While it is contemplated that four clips will be used with the four lugs illustrated in FIG. 14, it is seen that in certain applications one or more of the lugs and clips could be omitted, i.e., two diagonally opposite lugs and clips might be eliminated.

Referring to FIGS. 15 and 16, perspective views of the front and back of a modified one piece, snap-in mounting device 214 are shown. The snap-in mounting device 214 comprises a plate 228 from the back surface 256 of which extend integral clips 235 and 236 and lugs 240 and 241. Each clip 235 or 236 has a general U-shape and includes an inner leg 237, integral with the plate 228, and generally straight, and a flexible arm 244. Preferably the mounting device 214 is molded of plastic, electrically insulating material, such as Bakelite.

Each flexible arm 244 forms locking or cam-like portions 272 comprising a sloping portion 270, a curved section 273 and a sloping portion 271. In FIG. 17, the dot-dash position illustrates the free position of the arm 270 prior to its being flexed.

The base of the U is opposite the plate 228 and the legs 237 are spaced apart to receive the circuit breaker case 217 therebetween.

The plate 228 overhangs the hole 216 in the panel 212 on all four sides, as in the previous embodiments, the panel 212 being close fitting at the sides of the circuit breaker case 217, but the hole 216 being sufficiently longer than the circuit breaker 210 to provide spaces above and below the circuit breaker into which the clips 235 and 236 may be inserted, only the upper space being shown in FIG. 17.

As in the previous embodiments, the lugs 240 and 241 project outwardly from the back surface 256 of the plate 228 and are received in wells 290 formed in the front wall of the circuit breaker case 217. The lugs 240 and 241 are secured to the circuit breaker case 217 by rivets which extend through suitable, aligned holes in the lugs and the circuit breaker case, as in the previous embodiments.

Referring to FIG. 17, preferably each flexible arm 244 is constructed so that an inner portion 280, near the base of the U of each clip 235 or 236, will engage the adjacent leg 237, regardless of the thickness of the panel 212, so that the sloping portion 270 always tends to be in compression, to thereby increase the force needed to release the circuit breaker 210 and mounting device 214 from the panel 212. This is important since, in certain instances, the connections to the circuit breaker terminals (not shown in FIG. 17) will be made after the circuit breaker is mounted on the panel by pushing the connections onto the back of the circuit breaker in the direction tending to push the circuit breaker forward, i.e., off of the panel, and it is desirable at such time that the circuit breaker remain mounted on the panel.

While in some of the appended claims reference is made to "top" and "bottom" or the like, it is understood that such direction terminology is intended as a matter of convenience and not as a limitation.

Having described this invention, what I claim is:

1. In combination, a circuit breaker including a case, and a snap-in mounting device for securing said circuit breaker in a hole of a panel, said snap-in mounting device comprising a plate having two lugs spaced from each other and positioned adjacent the top and bottom surfaces of said case, said plate overhanging the hole in said panel, said lugs projecting toward said case, the front wall of said case having two wells receiving said lugs, two spring clips one of which is associated with each lug, each clip having a foot through which one of the lugs extend, whereby the foot of each clip is trapped between the front wall of said case and said plate, each clip including a body, said bodies being disposed one against the top surface and one against the bottom surface of said case, each clip including a spring arm extending away from the adjacent surface of said case, each spring arm comprising a cam-like locking portion adapted to engage the adjacent edge portion of the panel for flexing the spring arms as said case is inserted into the panel from the front thereof, and the locking portions locking the panel between the locking portions and the overhanging portions of said plate.

2. The structure recited in claim 1 wherein said case is formed by approximately two half-cases, said wells being formed approximately one-half in each half-case, said half-cases and said lugs having aligned holes, and rivets extending through said holes to secure said plate to said case and said half-cases to each other.

3. The structure recited in claim 2 and further including depressions formed about each lug in the rear surface of the plate to receive the feet of said clips.

4. The structure recited in claim 3 and further including said spring arms having legs, recesses in the rear surface of said plate to receive the legs of the spring arms adjacent said plate and provide stop surfaces for said legs to bias the feet against the lugs and preload said spring arms, so that said clips are secured to said plate as a subassembly.

5. In combination, a unitary circuit breaker including a case, said case having a front wall, and a front entry snap-in mounting subassembly for securing said circuit breaker to a panel having a hole, said snap-in mounting subassembly comprising a plate, enterfitting means securing said plate in abutment to said front wall of said case, a spring clip carried by said plate and including a cam-like locking portion adapted to engage the adjacent edge portion of the panel for flexing said spring clip as said case is inserted into the panel from the front thereof or withdrawn therefrom from the front, whereby the panel is locked between the cam-like locking portion and the overhanging portions of said plate.

6. In combination, a unitary circuit breaker including a case, said case having a front wall, and a front entry snap-in mounting subassembly for securing said circuit breaker to a panel having a hole, said snap-in mounting subassembly comprising a plate, means to secure said plate in abutment with said front wall of said case, a spring clip carried by said plate and including a cam-like locking portion adapted to engage the adjacent edge portion of the panel for flexing said spring clip as said case is inserted into the panel from the front thereof or withdrawn therefrom from the front, whereby the panel is locked between the cam-like portion and the overhanging portions of said plate, said spring clip being separate from said plate, said means including a lug extending from said plate into the front wall of said case, said spring clip having a foot through which said lug extends, said plate having a recess receiving a part of said spring clip to bias said foot against said lug and preload said spring clip, so that said spring clip is secured to said plate as a subassembly.

7. In combination, a unitary circuit breaker including a case, said case having a front wall, a front entry snap-in mounting subassembly for said circuit breaker, and a panel to which said circuit breaker is mounted, said panel having a hole of approximately the same width as said case and a length longer than said case to define a space, said snap-in mounting subassembly including a plate and means securing said plate to said front wall of said case, and a locking means carried by said plate and disposed in said space and locking with edge portion of said panel adjacent said case, said locking means being trapped, in part, between said plate and said front wall of said case.

8. In combination, a unitary circuit breaker including a case, said case including a front wall, and a unitary snap-in mounting device for securing said circuit breaker to a panel having a hole, said snap-in mounting device comprising a plate, means to secure said plate in abutment with said front wall of said case, a clip formed integrally with said plate and including a cam-like locking portion adapted to engage the adjacent edge portion of the panel for flexing said clip as said case is inserted into the panel from the front thereof or withdrawn therefrom from the front thereof, whereby the panel is locked between the cam-like locking portion and the overhanging portions of said plate, said means including a lug extending from said plate into said front wall of said case, said plate and clip being formed of electrical insulating and plastic material.

9. In combination, a unitary circuit breaker including a case, said case including a front wall, a front entry snap-in mounting subassembly for said circuit breaker, and a panel to which said circuit breaker is mounted, said panel having a hole of approximately the same width as said case and a length longer than said case to define a space, said snap-in mounting subassembly including means securing said plate to said front wall of said case, and a locking means carried by said plate and disposed in said space and locking with the edge portion of said panel adjacent said case, said locking means including a clip formed integrally with said plate, said plate and clip being formed of electrical insulating and plastic material, said means including a lug projecting into the front wall of said case and carried by said case, said case being formed by two approximate half-cases, said front wall having a well receiving said lug, and a rivet extending through said half-cases and said lug securing said half-cases to each other and the snap-in mounting subassembly to said case.

10. The structure recited in claim 9 wherein said hole in said panel is sufficiently longer than said case to define two spaces one at opposite ends of said case, two lugs project into the front of said case into two wells, and said plate is formed with two clips disposed in said spaces and locking with the edge portions of said panel on opposite sides of said case.

11. In combination, a circuit breaker including a case, said case being generally hexahedronal and including a front wall, left and right hand side walls, top and bottom surfaces, and a back wall from which extend suitable terminals, a panel on which said circuit breaker is to be mounted, said panel having a hole adapted to receive said case from the front of said panel and permitting said case to pass through said hole, said hole being slightly wider than said case, said hole being substantially longer than said case, a plate overhanging said hole, said plate substantially overhanging the top and bottom of said case, two clips, the length of said hole being such as to accommodate one of said clips between the top surface of said case and the adjacent part of said panel which defines said hole and also accommodating the other of said clips between the bottom surface of said case and the adjacent part of said panel which defines said hole, said plate having integral lugs projecting from its back surface toward said case, said lugs extending through the front wall of said case and being secured to said case, one of said clips being positioned between the top surface of said case and the adjacent part of the panel which defines said hole, the other of said clips being positioned between the bottom surface of said case and the adjacent part of said panel which defines said hole, and each clip having a resilient arm including a cam-like locking portion, said panel being locked between the locking portion and said plate.

References Cited

UNITED STATES PATENTS

| | | |
|---|---|---|
| 2,446,141 | 7/1948 | Parsons. |
| 3,213,189 | 10/1965 | Mitchell et al. |
| 3,249,726 | 5/1966 | Long. |
| 3,337,708 | 8/1967 | Cerveny et al. |

H. O. JONES, *Primary Examiner.*